United States Patent
Joshi et al.

(10) Patent No.: US 8,495,605 B2
(45) Date of Patent: Jul. 23, 2013

(54) POLICY-BASED PROGRAM OPTIMIZATION TO MINIMIZE ENVIRONMENTAL IMPACT OF SOFTWARE EXECUTION

(75) Inventors: Neeraj Joshi, Morrisville, NC (US); David L. Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1437 days.

(21) Appl. No.: 12/140,045

(22) Filed: Jun. 16, 2008

(65) Prior Publication Data

US 2009/0313615 A1 Dec. 17, 2009

(51) Int. Cl.
*G06F 9/45* (2006.01)
*G06F 1/32* (2006.01)
*G06F 11/30* (2006.01)

(52) U.S. Cl.
USPC ........... 717/154; 717/153; 717/159; 713/320; 702/186

(58) Field of Classification Search
None
See application file for complete search history.

(56) References Cited

U.S. PATENT DOCUMENTS

| | | | |
|---|---|---|---|
| 6,795,781 B2 | 9/2004 | Aldridge et al. | |
| 6,922,829 B2 * | 7/2005 | Ward et al. | 717/154 |
| 7,076,775 B2 * | 7/2006 | Webster et al. | 717/159 |
| 7,496,903 B2 * | 2/2009 | Rees et al. | 717/130 |
| 7,574,704 B2 * | 8/2009 | Fulton et al. | 717/159 |
| 8,335,661 B1 * | 12/2012 | Satish | 702/186 |
| 2001/0032332 A1 * | 10/2001 | Ward et al. | 717/9 |
| 2003/0014742 A1 * | 1/2003 | Seth et al. | 717/158 |
| 2004/0015922 A1 * | 1/2004 | Kitakami et al. | 717/154 |
| 2004/0163079 A1 * | 8/2004 | Noy et al. | 717/154 |
| 2005/0039172 A1 * | 2/2005 | Rees et al. | 717/130 |
| 2005/0138450 A1 * | 6/2005 | Hsieh | 713/320 |
| 2005/0229149 A1 | 10/2005 | Munter et al. | |
| 2006/0101441 A1 * | 5/2006 | Fulton et al. | 717/158 |
| 2007/0300214 A1 * | 12/2007 | Chang et al. | 717/153 |
| 2008/0320458 A1 * | 12/2008 | Aronson et al. | 717/154 |

OTHER PUBLICATIONS

Hsu, C., et al., The Design, Implementation, and Evaluation of a Compiler Algorithm for CPU Energy Reduction, Proceedings of the ACM SIGPLAN 2003 conference on Programming language design and implementation, ACM, 2003, pp. 38-48, [retrieved on Apr. 2, 2013], Retrieved from the Internet: <URL:http://dl.acm.org/>.*

(Continued)

*Primary Examiner* — Thuy Dao
*Assistant Examiner* — Geoffrey St Leger
(74) *Attorney, Agent, or Firm* — Steven L. Nichols; Van Cott, Bagley, Cornwall & McCarthy P.C.

(57) ABSTRACT

A method for policy-based program optimization of existing software code is performed where the code is segmented into code modules. The optimization is based on a performance policy that defines a target characteristic and a sacrificial characteristic relating to the existing software code and further defines an allowable degradation of the sacrificial characteristic resulting from optimization of the target characteristic. This method may include identifying code modules that contribute to suboptimal performance of the software code with respect to the target characteristic; identifying code transformations that increase performance of the suboptimal code modules with respect to the target characteristic; and optimizing the identified code modules by selectively applying the code transformations in accordance with the performance policy to increase performance of the software code with respect to the target characteristic.

20 Claims, 2 Drawing Sheets

OTHER PUBLICATIONS

Tiwari, V., et al., Compilation Techniques for Low Energy: An Overview, IEEE Symposium on Low Power Electronics, IEEE, 1994, pp. 38-39, [retrieved on Jun. 15, 2012], Retrieved from the Internet: <URL:http://ieeexplore.ieee.org/>.*

Park, S., et al., Managing Energy-Performance Tradeoffs for Multithreaded Applications on Multiprocessor Architectures, Proceedings of the 2007 ACM SIGMETRICS international conference on measurement and modeling of computer systems, ACM, 2007, pp. 169-180, [retrieved on Feb. 7, 2012], Retrieved from the Internet: <URL:http://dl.acm.org/>.*

"Optimization (Computer Science)"; Apr. 24, 2008; Wikipedia.

* cited by examiner

POLICY-BASED PROGRAM OPTIMIZATION TO MINIMIZE ENVIRONMENTAL IMPACT OF SOFTWARE EXECUTION

BACKGROUND OF THE INVENTION

Computer programs are typically written to optimize performance as judged by certain specific desired characteristics, such as usability and maintainability characteristics. However, computer programs will have a number of other performance characteristics that may be traded off, or that have not been considered, traditionally in evaluating performance.

For example, the environmental impact or performance of a computer program is increasingly of concern as the number of computers and software-controlled processes increases. The environmental impact of a computer program may include the amount of electrical power, rack space, and cooling capacity required to execute the program. Specifically, the resources consumed in hardware construction and the generation of power required for executing a computer program result in negative environmental impacts such as greenhouse gas emission, consumption of natural resources, toxic chemical byproducts, and other pollutants.

In many cases, modifying existing software programs to optimize their environmental performance is an attractive alternative to abandoning or replacing the existing software. Abandoning an existing software program totally eliminates the function that the software program performed. Particularly in cases where the software performs a necessary function, abandonment may not be a viable option. Replacing existing software with improved software is feasible only where a viable and more environmentally friendly software program exists. Even where such a viable and more environmentally friendly software program exists, there may be other barriers to its use such as cost, reduced or altered functionality, and the disruption of installing the replacement program.

BRIEF SUMMARY OF THE INVENTION

A system for policy-based program optimization of existing software code includes a performance policy which defines an allowable degradation of a sacrificial characteristic as the result of the optimization of a target characteristic; a construct signature which identifies a suboptimal operation within the existing software code that results in suboptimal performance of the target characteristic; and a transformation module which uses the construct signature to identify the suboptimal operations within the existing software code and modifies the suboptimal operations to optimize the target characteristic in compliance with performance policy. A method for policy-based program optimization includes receiving performance policy defining a target characteristic, a sacrificial characteristic and the allowable degradation of the sacrificial characteristic resulting from the optimization of the target characteristic; identifying suboptimal code modules that contribute to suboptimal performance of the target characteristic; identifying code transformations that improve the suboptimal performance of the suboptimal code modules; evaluating the code transformations on the suboptimal code modules according to the performance policy; optimizing the suboptimal code modules by applying the code transformations to produce an improved software code.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION OF THE INVENTION

Figure 1:
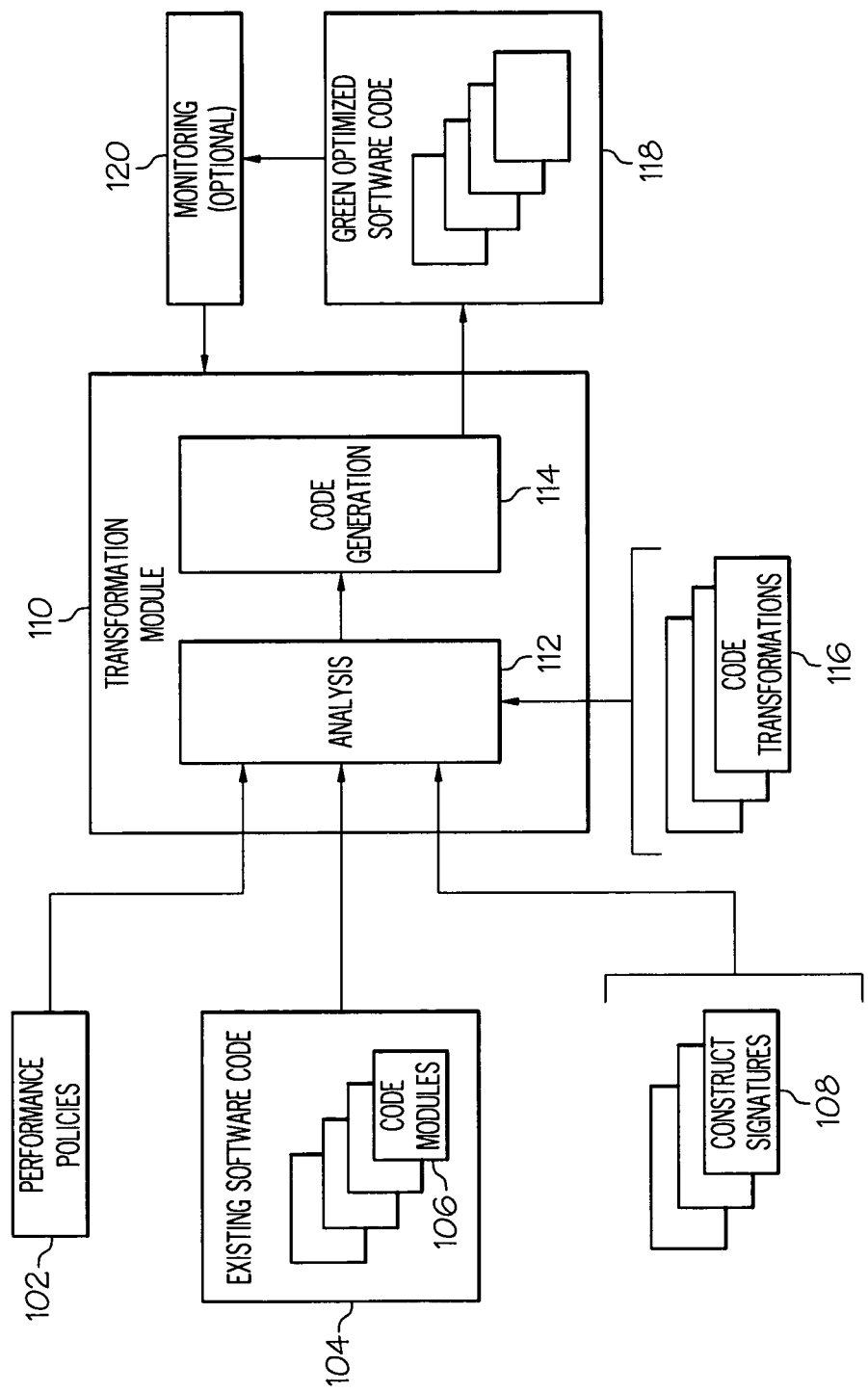
FIG. 1 is a diagram showing one illustrative system for making policy-based modifications to existing software code, according to one exemplary embodiment of principles described herein.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having a computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Throughout the specification and appended claims, the term "green" or "greenness" is used to describe the environmental impact of a particular activity or process, including the execution of software considering both the resources consumed to produce the hardware that supports that software as well as the power required to operate that hardware during execution of the software. Software execution that has a minimal negative impact on the environment is considered more "green," while software execution with higher negative impact is considered less "green."

As noted above, computer programs are typically written to optimize performance in terms of specific characteristics, such as usability and maintainability characteristics. However, computer programs have a number of other performance characteristics that may have been neglected traditionally, but that are increasingly important. For example, the environmental performance of computer programs is increasingly of concern as the number of computers and software-controlled processes increases.

As used herein and in the appended claims, the term "target characteristic" will be used to refer to a specific characteristic of a given computer program for which performance should be improved or optimized. In the following examples, the "target characteristic" will be reduced environmental impact or greenness. As also used herein and in the appended claims, the term "sacrificial characteristic" will be used to refer to another characteristic of a computer program's performance that has a lower priority or importance than does the target characteristic and which can be degraded if such will result in a sufficiently significant increase in a target characteristic. Various thresholds and standards may be predetermined to govern whether an improvement in a target characteristic is sufficient to warrant a corresponding degradation in a sacrificial characteristic.

An improvement in the environmental performance of a computer program may take a variety of forms including minimizing the total power or physical resources required to execute the program, drawing power or resources from less environmentally disruptive sources, or other techniques. The optimization of environmental performance is used throughout the specification as one example of a policy-based optimization of a target characteristic.

In many instances modifying existing programs to optimize a target characteristic is an attractive option if the functionality and performance of the existing program is not substantially impaired. However, many software programs have complex functions and multiple interdependencies between those functions. Many of these interdependencies are not obvious or explicit. Because of these interdependencies, making a single modification can result in unforeseen disruptions to multiple functions with the software.

To assist programmers in modifying software, a variety of specialized programming tools/paradigms have been created. One of these paradigms is aspect oriented programming. Aspect orient programming can be used for various purposes and is often used to add logging to a program or to change function calls. Aspect oriented programming attempts to aid programmers in modifying existing programs by separating various sections of code into distinct parts that overlap in functionality as little as possible. By separating various sections of code into distinct parts, also called concerns, the software can be encapsulated into separate modules. In theory, each of the separate modules can be modified without affecting the other modules thereby facilitating the modification and improvement of very complicated and interrelated programming. However, even in aspect oriented programming, many aspects of functionality may still have to span multiple modules.

Following the separation of the various concerns, modifications can be made to the various modules, interfaces between modules, or to the data passed between modules. By way of example and not limitation, various tools within aspect oriented programming provide for the ability to intercept and modify data passing between modules, alter the behavior of the module's code, apply additional behavior, or make structural changes to the program by adding members or parents.

FIG. 1 is a diagram showing one illustrative system for making policy-based modifications to an existing software program (104). The existing software program (104) may comprise newly written code, recently compiled code, or legacy code. The code may be written in source form, e.g., Java, C#, or other languages of the like. Alternatively, according to one exemplary embodiment, the code may be supplied in an intermediate form, e.g., byte code form or object code. As described above, the code (104) may have been prepared according to aspect oriented programming techniques and thus be comprised of various code modules (106). By way of example and not limitation, these code modules (106) may be Java class files, C object code, or concerns generated by an aspect oriented programming application.

Performance policies (102) are rules which identify one or more target characteristics for which performance is to be optimized, also referred to as optimization parameters. As described above, the performance policies (102) also define the desired or acceptable trade-off between sacrificial characteristics and target characteristics. In the context of greenness, the performance policy may define an acceptable trade-off between sacrificial characteristics and improved environmental performance. For example, a particular organization may be willing to trade a 5% reduction in a sacrificial characteristic or performance measure to gain a 10% increase in a target characteristic such as greenness.

To determine such desired or acceptable trade-offs, it may be noted that sacrificial characteristics, by their nature, are various performance parameters that may be performed at least some of the time in excess of a required minimum or standard. Consequently, sacrificial characteristics can be compromised to obtain improvements in a target characteristic without being reduced below that required minimum or standard. Consequently, the performance policies (102) may also contain a rule or rules defining each minimum acceptable level of performance for one or more sacrificial characteristics. These rules can be used separately or be combined to define the performance boundaries governing the overall behavior of the optimized program.

By way of example and not limitation, a sacrificial characteristic may be the execution time of the software code. Execution time may be measured in a number of ways including wall clock time, central processing unit (CPU) cycles, and other methods. In our present example, there may be a maximum amount of time in which the code must be executed to support some other function. If the code is currently being executed in substantially less time, the execution time of the code may be increased if doing so also provides a way of increasing the greenness of executing the code.

Other sacrificial characteristics may include, but are not limited to, performance characteristics relating to CPU utilization, hard drive space, memory allocation, network traffic, or other usability or maintainability factors. Target characteristics may include various measures of the environmental impact of the software program including the total quantity of power consumed, the peak power consumption rate, the source of the power, the physical resources required to execute the program, or other environmental measures.

Thus, as indicated by this example, performance policies may be defined according to organizational needs or to accommodate other parallel operations. The performance policy may define an upper or lower bound of a sacrificial characteristic. For example, where multiple software applications are operating on a single central processor, the performance policy (102) may specify that the program in question may utilize no more than 50% of the available CPU clock cycles at any given time.

Referring still to FIG. 1, construct signature (108) contains data which allows various code modules to be recognized, associated or assigned with a performance and/or green score, and matched with code transformations (116) which optimize or improve the greenness of the corresponding code module. According to one exemplary embodiment, the performance and greenness scores of a code module may be, or may have been, empirically determined by running various sections of code in a simulated environment.

The code transformations (116) may contain a variety of information including compiling operations which can be performed on recognized code modules and alternative code that is available to replicate the functionality of existing code with different performance characteristics. The code transformations (116) also include methods for estimating improvements in the overall greenness scores of a software program that results from a changed compiling operation or replacement of the existing software code (104) with alternative code.

As shown in FIG. 1, the existing software code (104), performance policies (102), and the construct signatures (108) are passed into a transformation module (110). The transformation module (110) is comprised of an analysis module (112) and a code generation module (114). The analysis module (112) may perform a number of operations on the existing software code (104). By way of example and not limitation, the analysis module (112) may utilize aspect oriented programming techniques to further segment the code (104). The analysis module (112) then uses the construct signatures (108) to identify various code modules (106) whose greenness can be improved according to the performance policies (102).

Specifically, code modules (106) which match identification patterns contained in the construct signatures (108) are environmentally suboptimal code which can be improved using various transformation techniques. According to one exemplary embodiment, the analysis module (112) may make preliminary estimates of a greenness score which will result from the recompilation of the code. For example, the analysis module (112) may attempt to estimate the number of times the code (104) will be run. If the code (104) will be run only a few times, the compilation overhead may have a greater environmental impact than allowing the code (104) to operate without modification. In this case, the analysis module (112) would pass the existing software code (104) through the process with no modification. For code that will run frequently, the analysis module (112) determines which code modules (106) match available construct signatures (108) and what action should be taken to improve those code modules (106).

For example, a code module (106) may be a command to access a hard drive to retrieve data for a central processing unit to process. Accessing the data in small segments allows the processor to begin processing data while additional data is being retrieved. This may improve performance but wastes a significant amount of electrical energy. The analysis module (112) uses the construct signatures to recognize this code module and match it to alternative code contained within a code transformation (116). The alternative code may contain instructions for accessing and retrieving the complete data segment from the hard drive in a single rather than segmented operation. This requires the CPU to wait until the entire retrieve operation is complete before beginning to process the data. The speed at which the green optimized code (118) can be executed is reduced, but the total amount of energy required to execute the green-optimized code (118) is minimized.

According to one exemplary embodiment, the analysis module (112) calculates total performance degradation of the all the recognized code modules and estimates the environmental score that would result from altering the recognized code modules. The analysis module (112) then compares the performance degradation to the improved environmental score. If the trade-off between the performance degradation and the improved environmental score is acceptable as defined by the performance policies (102), the analysis module (112) proceeds with the code optimization. By way of example and not limitation, if the alterations lead to neutral or positive impacts on the performance of the software code, the alterations will always be performed. However, if several of the alternations to specific code modules (106) result in an unacceptable reduction in performance as defined by the performance policies (102), the analysis engine may implement only a portion of the possible changes.

According to one exemplary embodiment, the construct signatures (108) may contain the initial performance scores and initial greenness scores for recognized code modules.

These scores could be a numerical value which accounts for various factors considered important by a particular organization. The code transformations may contain resultant performance scores and resultant greenness scores for alternative code or optimized code. The initial scores and resultant scores could be summed to estimate the total performance degradation and total improvement in greenness that would result from the optimization of the code. This preliminary estimate could allow the transformation module to test the proposed transformation against the performance policy. By way of example and not limitation, the performance policy may state that a 5% decrease in performance would be acceptable only when accompanied by 10% or greater increase in environmental score. If the preliminary estimate of the performance and greenness scores meets this criterion, the transformation module (110) may proceed with the code optimization. If the preliminary estimate does not meet this criterion, the transformation module (110) may modify the proposed transformation.

After the analysis module (112) has performed the necessary identification of suboptimal code and evaluated various optimization schemes, the code modules (106) are passed to the code generation module (114) for actual modification. The code generation module (114) applies various code transformations (116) to produce improved software code (118). According to one exemplary embodiment, this improved software code is green optimized software code (118). The green optimized software code (118) may then be executed with an improvement in the targeted characteristic or characteristics.

According to one optional embodiment, the execution of the green optimized software code (118) could be monitored to determine if the performance degradation and green score are within the allowable limits and trade-offs defined by the performance policies (102). By way of example and not limitation, the monitoring may include measuring the time it takes for the green optimized software code (118) to execute or measuring a temperature rise of a CPU during the execution of the green optimized code (118). If the green optimized software code (118) violates one or more performance policies (102) during its actual operation, the monitoring module (120) may return the code to the transformation module (110) for further modification or to roll back the past transformations.

Figure 2:
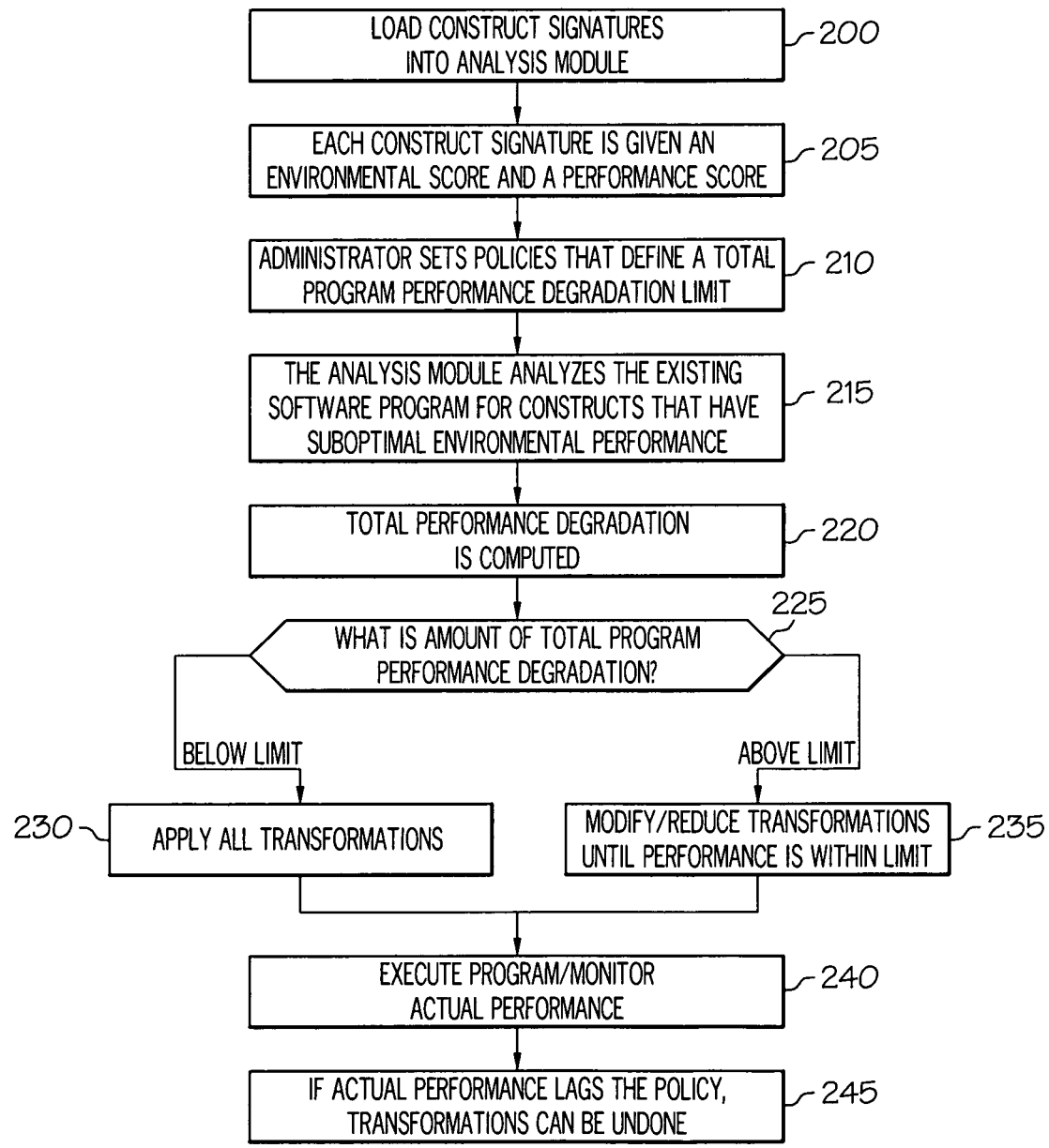
FIG. 2 is a flowchart showing one illustrative method for making policy-based modifications to existing software code, according to one exemplary embodiment of principles described herein.

FIG. 2 is a flowchart showing an illustrative method for making policy-based modification to an existing software program, according to one exemplary embodiment of principles described herein. In a first step, the construct signatures are loaded into the analysis module (step 200). These construct signatures comprise one or more patterns which can be compared to various code modules to identify a code module's function and other attributes. Each of the construct signatures identifies a code module that is known to be environmentally suboptimal. Each construct signature is given an environmental score and a performance score (step 205). These scores can be used to estimate the environmental and other performance characteristics of any code module which matches the pattern contained within the construct signature. The environmental score is based on the expected environmental impact of executing the code module identified by the construct signature. According to one exemplary embodiment, a code module having a relatively large negative environmental impact would have a low environmental score and a code module having a minimal environmental impact would have a higher score. Environmental impact may be measured in a variety of ways including raw power consumption, carbon dioxide emissions generated in providing the required power, the physical computing infrastructure required to execute the code, and other factors.

As mentioned above, the performance of a code module which matches a construct signature may be measured in a variety of ways including measuring the total execution time of the code, the number of CPU clock cycles required to execute the code, the amount of memory required, the amount of disk space required, the network traffic generated, maintainability, usability or any other relevant measure. According to one exemplary embodiment, a service level agreement could be used as a measure of performance. A service level agreement is typically a contract that exists between customers and their service provider in which the level of service the service provider is obligated to provide is formally defined. Service level agreements may represent a common understanding about response times, network bandwidth, available resources, services, priorities, responsibilities, or other measures of a level of service. In many cases, a service level agreement may represent the lower bound on acceptable performance.

The administrator sets policies that govern the maximum performance degradation that a program can suffer in exchange for minimized environmental impact (step 210). In some embodiments, the administrator may create a rule which states that any performance degradation that does not violate a service level agreement is allowable. In other cases, the administrator may define the trade-off between a decrease in a performance score and the increase in an environmental score. For example, the administrator may require that the increase in the environmental score must be at least two times the decrease in the performance score. In some circumstances, the administrator may set a number of rules or constraints which act together to define the desired optimization of the code.

The analysis module analyzes the existing software code modules that match any of construct signatures and, therefore, have an expected suboptimal environmental performance (step 215). The potential improvement in the environmental score can be computed by summing the total change in scores for each code module targeted for improvement. In some embodiments, only a small portion code modules contained in the existing software code may match construct signatures. Further, only a portion of the code modules which match a construct signature may be identified as having suboptimal environmental performance. However, these code modules may represent frequently utilized functions, such as data retrieval, writing to disk, arithmetical computations, or communication functions. An improvement in one of these frequently utilized functions can result in a significant improvement in environmental behavior of the overall program.

The amount of program performance degradation is then determined (determination 225). As described above, the total performance degradation can be estimated by summing the measure of reduced performance over all the code modules. According to one illustrative embodiment, if the performance degradation is below the limits set in the performance policy, all available transformations are applied by the code generation module (step 230). If the performance degradation is above the limit set in the performance policy, the transformations are modified or reduced until the performance is within an acceptable range as defined by the performance policy (step 235). As mentioned above, transformations that improve the environmental score while having a neutral or positive impact on the performance score would almost always be applied.

A variety of optimization techniques could be used to maximize the environmental return while minimizing the performance degradation. According to one exemplary embodiment, linear programming techniques could be used. A linear programming technique typically determines the way to achieve the best outcome (such as lowest cost, greatest environmental impact reduction, and/or lowest performance degradation) given some list of requirements represented as linear equations. For example, the performance policies could be represented by a polytope or series of lines making a polytope.

The optimized program is then executed (step 240). According to one exemplary embodiment, the actual performance of the program is also monitored. If the actual performance of the program lags the policy or has other unanticipated negative effects, one or more the transformations can be undone (step 245). According to one exemplary embodiment, undoing previously applied transformations would not be an autonomous function but would required approval by an administrator.

The processes and steps described in FIG. 1 and FIG. 2 are only one exemplary embodiment of systems and methods which could be used to enhance the environmental performance of software code. A variety of other methods could be used. By way of example and not limitation, the methods shown in FIG. 2 could be utilized in addition to other conventional code optimization techniques. These conventional code optimization techniques could be performed prior to operations being performed by the transformation module (110) or after the code is green optimized. Additionally, the code optimization could be an iterative process in which various code modules (106, FIG. 1) are identified as being environmentally suboptimal, performance and green scores are estimated, code substitutions or other transformations performed, and green optimized code (118, FIG. 1) is generated. This green optimized code (118, FIG. 1) is then reintroduced into the process and re-analyzed to determine if further improvements can be made. This may produce progressively more optimal code that justifies the additional time and energy required to iteratively process the code.

Optimizing the greenness of an existing software code can be accomplished by a variety of unconventional techniques that go beyond the simple reduction of the amount of energy required to execute the code. The greenness of the code could be optionally enhanced by executing the green optimized code on servers in a geographically remote location that has better access to low impact energy sources such as hydroelectric, geothermal, or wind power generators. The timing of the code execution could also be altered so that the power to execute the code is utilized outside of peak power demand. The code could also be executed using distributed programming techniques. Distributed programming techniques allocate various sections of code among a number of computers or processors. The computers running the distributed program may execute their portion of the code when their CPU may otherwise be idle. By making more efficient use of existing hardware, the environmental impact of manufacturing/purchase of additional computers can be avoided. Additionally, parallel execution of code elements can increase the speed at which the program executes, thereby allowing greener optimization to be performed while meeting the performance requirements/trade-offs dictated in the performance policy.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method executed by a processor for policy-based program optimization of existing software code that is segmented into code modules, said optimization being based on a performance policy, said performance policy defining a target characteristic and a sacrificial characteristic relating to said existing software code; said performance policy further defining an allowable degradation of said sacrificial characteristic resulting from optimization of said target characteristic, said method comprising:

identifying code modules that contribute to suboptimal performance of said software code with respect to said target characteristic;

identifying code transformations that increase performance of said suboptimal code modules with respect to said target characteristic;

calculating total performance degradation resulting from the identified code transformations and quantifying a corresponding improvement in said target characteristic;

applying said performance policy to determine which identified code transformations should be applied based on a comparison of said calculated total performance degradation and corresponding improvement in said target characteristic; and optimizing said identified code modules by selectively applying said code transformations in accordance with said performance policy to increase performance of said software code with respect to said target characteristic.

2. The method of claim 1, wherein said target characteristic is greenness of said existing software code.

3. The method of claim 2, wherein said sacrificial characteristic is execution time of said existing software code.

4. The method of claim 1, further comprising evaluating an actual performance of said software code following application of said code transformations.

5. The method of claim 4, further comprising further altering said software code if said actual performance of said software code following application of said code transformations falls below said allowable degradation of said sacrificial characteristic.

6. The method of claim 5, wherein further altering said software code comprises undoing at least one of said code transformations.

7. The method of claim 1, wherein said code module is at least one of: a software object, a software class, and a software construct.

8. The method of claim 1, wherein said performance policy is based on a service level agreement.

9. The method of claim 1, wherein said sacrificial characteristic comprises at least one of program execution time measured in wall clock time, program execution time measured in CPU cycles, CPU utilization, hard drive space, memory allocation, network traffic, usability, and maintainability.

10. The method of claim 1, wherein said code transformations further comprise at least one of: alternative code to be substituted for said identified code modules and optimization operations to be performed on said identified code modules.

11. A method executed by a processor for policy-based program optimization of existing software code that is segmented into code modules, said optimization being based on a performance policy, said performance policy defining a target characteristic and a sacrificial characteristic relating to said existing software code; said performance policy further defining an allowable degradation of said sacrificial characteristic resulting from optimization of said target characteristic, said method comprising:

identifying code modules that contribute to suboptimal performance of said software code with respect to said target characteristic;

identifying code transformations that increase performance of said suboptimal code modules with respect to said target characteristic; and optimizing said identified code modules by selectively applying said code transformations in accordance with said performance policy to increase performance of said software code with respect to said target characteristic;

wherein said identifying code modules further comprises using a construct signature comprising a pattern that identifies suboptimal code modules, wherein said construct signature is a data structure containing data which allows various code modules to be associated with a performance or green score and matched with code transformations which improve a greenness of the corresponding code module.

12. The method of claim 11, wherein said construct signature further comprises a performance score and a greenness score associated with matching code modules; said construct signature further identifying code transformations configured to increase the greenness score of said matching code modules.

13. The method of claim 12, wherein said construct signature further comprises a second performance score and a second green score associated with implementing said identified code transformations.

14. The method of claim 13, further comprising evaluating said code transformations by calculating degradation of said sacrificial characteristic using said first performance score and said second performance score; and calculating improvement of said target characteristic using said first green score and said second green score.

15. The method of claim 14, wherein said code transformations are selectively applied to prevent said degradation of said sacrificial characteristic from falling below said allowable degradation defined by said performance policy.

16. A system including a processor for policy-based program optimization of existing software code comprising:

existing software code;

a performance policy, said performance policy defining an allowable degradation of at least one sacrificial characteristic of said existing software code to obtain an increase of at least one target characteristic of said existing software code;

a construct signature, said construct signature identifying a suboptimal operation within said existing software code that results in suboptimal performance with respect to said at least one target characteristic; and a transformation module, said transformation module using said construct signature to identify said suboptimal operations within said existing software code, said transformation module modifying said existing software code in compliance with said performance policy to obtain an increase in said at least one target characteristic of said existing software code, wherein said construct signature is a data structure containing data which allows various code modules to be associated with a performance or green score and matched with code transformations which improve a greenness of the corresponding code module.

17. The system claim 16, wherein said at least one target characteristic comprises environmental performance of said existing software code.

18. The system of claim 17, wherein said environmental performance of said existing software code comprises a total energy required to execute said program.

19. The system of claim 18, wherein said sacrificial characteristic is a total execution time of said existing software code.

20. A computer program product for policy-based program optimization to minimize environmental impact of software execution, the computer program product comprising:

a computer usable storage memory having computer usable program code embodied therewith, the computer usable program code comprising:

computer usable program code configured to receive existing software code, said software code comprising at least one code module;

computer useable program code comprising a performance policy, said performance policy containing at least one rule defining acceptable performance of said software code;

computer useable program code comprising a construct signature, said construct signature comprising identifying a suboptimal code module and a code transformation for improving said suboptimal code module, computer usable program code configured to match said suboptimal code modules with said construct signatures; and computer usable program code configured to optimize said suboptimal code modules by applying said code transformations, wherein said construct signature is a data structure containing data which allows various code modules to be associated with a performance or green score and matched with code transformations which improve a greenness of the corresponding code module.

* * * * *